United States Patent [19]

Sano

[11] 4,165,777
[45] Aug. 28, 1979

[54] DEVICE FOR JOINING SURFACES OF A SPLIT RIM IN A WHEEL

[75] Inventor: Shoichi Sano, Tokorozawa, Japan

[73] Assignee: Honda Giken Kogyo Kabushiki Kaisha, Tokyo, Japan

[21] Appl. No.: 918,826

[22] Filed: Jun. 22, 1978

[30] Foreign Application Priority Data

Jun. 24, 1977 [JP] Japan .............................. 52-83154[U]

[51] Int. Cl.² ............................................. B60B 25/02
[52] U.S. Cl. ............................ 152/411; 152/DIG. 10; 301/63 D
[58] Field of Search .............. 301/35 R, 63 D, 63 DS, 301/35 BJ, 35 SL; 152/DIG. 10, 404, 405, 411–413

[56] References Cited

U.S. PATENT DOCUMENTS

| 2,871,905 | 2/1959 | Stanton | 152/404 |
| 4,102,379 | 7/1978 | Kamiya | 152/DIG. 10 X |

FOREIGN PATENT DOCUMENTS

| 551967 | 1/1958 | Canada | 152/DIG. 10 |
| 1322188 | 2/1963 | France | 301/63 S |

Primary Examiner—Robert J. Spar
Assistant Examiner—Charles A. Marmor
Attorney, Agent, or Firm—Haseltine, Lake & Waters

[57] ABSTRACT

A device for sealing joining surfaces of a split rim in a wheel. The split rim comprises an outboard rim and an inboard rim. A joining surface of the outboard rim is formed at its outer periphery with an annular recess of L-shaped section. The annular recess has a bottom surface formed at its base portion with a peripheral groove which receives therein an inner periphery of a seal ring. A joining surface of the inboard rim has at its outer peripheral portion an annular projection of a stepped-like section. The depth of the annular recess is shorter than the sum of the diameter of the seal ring and the thickness of the inner annular projection.

3 Claims, 2 Drawing Figures

DEVICE FOR JOINING SURFACES OF A SPLIT RIM IN A WHEEL

BACKGROUND OF THE INVENTION

1. Field of the Invention

The present invention relates to a device for joining by sealing surfaces of a split rim in a wheel with a tubeless tire.

In a wheel, a split rim is divided right and left in a direction of a wheel axis and mounts on its periphery a bead portion of a tubeless tire. The inner peripheral surfaces of an opening of the tubeless tire are directly sealed by the split rim so that joining surfaces of the split rim are opposed to the inner peripheral surfaces of the opening of the tubeless tire. It is, therefore, desirable to positively seal the joining surfaces and to simply place a sealing device on the joining surfaces of the split rim.

SUMMARY OF THE INVENTION

It is the main object of the present invention to overcome the defects of the prior art.

It is, therefore, another object of the present invention to provide a device for sealing joining surfaces of a split rim which can achieve these objects noted above and which is simple in construction.

The principal features of the invention are directed to an apparatus for joining surfaces of a split rim in a wheel, said wheel comprising: a split rim having an outboard rim and an inboard rim having joining surfaces joined and integrally connected by connecting means, a tubeless tire mounted and held between rim flanges of said split rim, the device being constructed such that a joining surface of one of said respective rims is formed at its outer periphery with an annular recess having an L-shaped section opening in a radial direction and in a direction of a wheel axis, said annular recess being provided with a bottom surface formed at its base portion with a peripheral groove adapted to receive therein an inner periphery of a seal ring while joining the respective surfaces of said rims, said inboard rim having at its outer peripheral portion an annular projection of stepped-like section adapted to be received into said annular recess through said seal ring, said annular projection being formed with an inner annular projection adapted to bias the seal ring in a direction of a wheel axis and an outer annular projection to cover the radial outer periphery of the seal ring.

The objects and advantages of the present invention will be best understood with respect to the accompanying specification claims and drawings.

DESCRIPTION OF THE INVENTION

Figure 1:
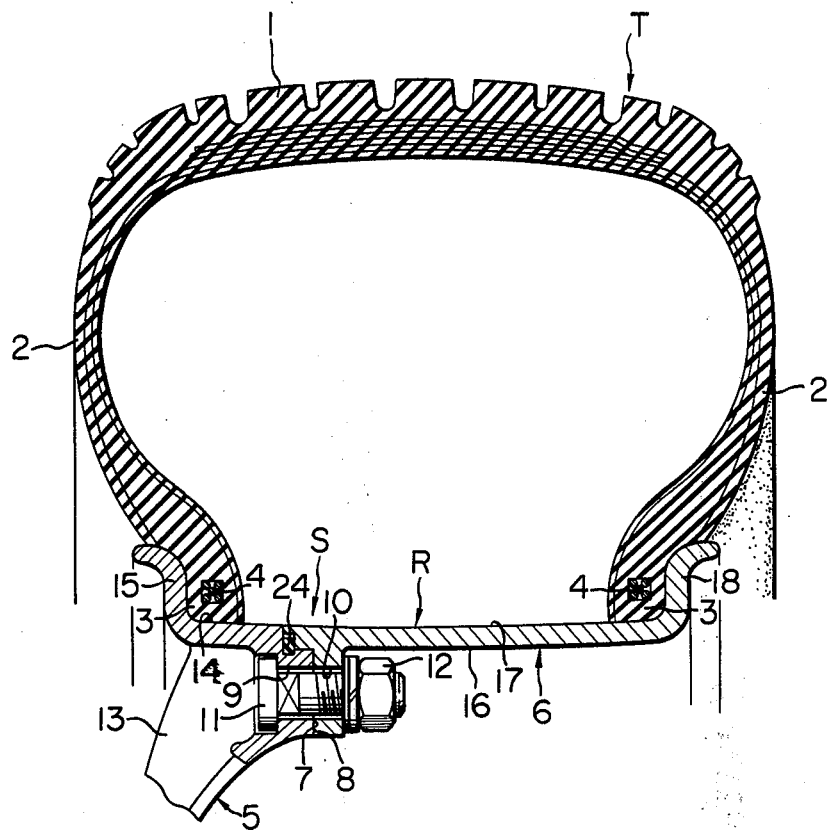
FIG. 1 is a longitudinal sectional view showing a part of a wheel provided with a device in accordance with the present invention.
Figure 2:
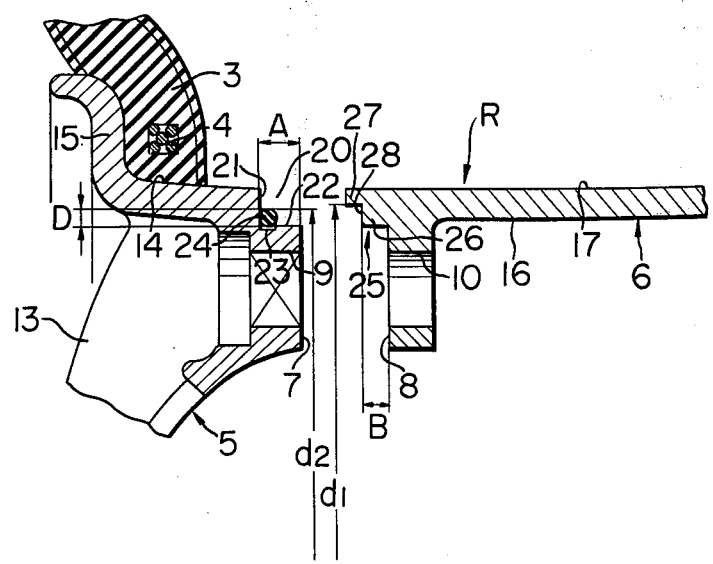
FIG. 2 is a longitudinal sectional view showing a part of the wheel with a split rim separated.

Referring now to FIGS. 1 and 2, there is shown a wheel which comprises a tubeless tire T and a split rim R.

The construction of these elements will be explained hereinafter.

The tubeless tire T, which has a well-known bisymmetrical construction, comprises a tread portion 1 having side wall portions 2 and 2 integrally extended right and left and bead portions 3 and 3 integrally extended gradually thickened in wall from the side wall portions 2 and 2, the bead portions 3 and 3 have bead wires 4 embedded therein.

The split rim R comprises an outboard rim 5 and an inboard rim 6, which are assembled in such a manner that joining surfaces 7 and 8 formed in inner surfaces of the rims 5 and 6 are joined, connecting bolts 11 are inserted into a plurality of bolt holes 9, 9 ..., 10, 10 .. . made in the outboard rim 5 and the inboard rim 6, and nuts 12 are screwed on the connecting bolts to integrally connect the outboard rim 5 and the inboard rim 6 in a direction of a wheel axis. The outboard rim 5 is constructed such that a body 13 has a narrow rim base 14 and at its outer end a rim flange 15 integrally extended to retain the bead portion 3 of the tubeless tire T. The inboard rim 6 is constructed such that a rim body 16 has a wide rim base 17 and at its outer end a rim flange 18 integrally extended to retain the bead portion 3 of the tubeless tire T similarly to the former. The rim bases 14 and 17 of the outboard rim 5 and the inboard rim 6, respectively, cooperate to cover the inner peripheral surfaces of the opening of the tubeless tire T in air-tight fashion.

Between outer peripheral portions of the joining surfaces 7 and 8 of the outboard rim 5 and the inboard rim 6 a sealing device S is retained, (which wil be described in detail) in order to prevent pressurized air introduced into the tubeless tire T from being leaked outside out of the joining surfaces 7 and 8. The joining surface 7 of the outboard rim 5 is formed at its outer periphery with an annular recess 20 having an L-shaped section, which is open in a radial direction and in a direction of the wheel axis. The annular recess 20 has a bottom surface 22 formed at its base portion with a peripheral groove 23 which receives therein an inner periphery of a seal ring 24, which is in turn retained within the annular recess 20.

On the other hand, the joining surface 8 of the inboard rim 6 has at its outer peripheral portion an annular projection 25 of stepped-like section extended therefrom, which can be received into the annular recess 20 through the seal ring 24. The annular projection 25 has an inner annular projection 26 adapted to bias the seal ring 24 in the direction of the wheel axis and an outer annular projection 27 to cover the radial outer periphery of the seal ring 24. The depth A of the annular recess 20 in the direction of the wheel axis is shorter than the sum of the diameter D in section of the seal ring 24 and the thickness B of the inner annular projection 26 in the direction of the wheel axis; that is, the relationship of $A < B + D$ is established. When the outboard rim 5 and the inboard rim 6 are assembled, the seal ring 24 may be biased and held in the direction of the wheel axis between the side 21 of the annular recess 20 and the side 28 of the inner annular projection 26. The inside diameter $d_1$ of the outer annular projection 27 is greater than the outside diameter $d_2$ of the seal ring 24 to cover the outer periphery of the seal ring 24.

A procedure for the assembly of the wheel in accordance with the present invention will be described. The seal ring 24 is slipped beforehand into the peripheral groove 23 formed in the bottom surface 22 of the annular recess 20 in the outboard rim 5, thereafter the joining surfaces 7 and 8 of the outboard rim 5 and the inboard rim 6 are joined from both right and left sides of the tubeless tire T. The rim flanges 15 and 18 are placed in engagement with the right and left bead portions 3 and 3 of the tubeless tire T, and the connecting bolts 11 are inserted into the bolt holes 9 and 10 and the nuts 12 are screwed on the bolts to integrally connect the outboard rim 5 and the inboard rim 6, thereby retaining the bead portion 3 of the tubeless tire T.

By the connection of the outboard rim 5 with the inboard rim 6, the annular projection 25 of the inboard rim 6 is fitted in the annular recess 20 of the outboard rim 5 through the seal ring 24. Since the depth A of the annular recess 20 in the direction of the wheel axis is shorter than the sum of the thickness B of the inner annular projection 26 of the annular projection 25 in the direction of the wheel axis and the diameter D in section of the seal ring 24, that is, the relationship of $A < B + D$ is established, the seal ring 24 is firmly urged between the side 21 of the annular recess 20 and the side 28 of the inner annular projection 26. The outer periphery of the seal ring 24 may be covered by the outer annular projection 27 of the annular projection 25. Furthermore, since the inside diameter $d_1$ of the outer annular projection 27 is greater than the outside diameter $d_2$ of the seal ring 24, there is no fear that the seal ring 24 may engage or contact the outer annular projection 27.

While in the above-described embodiment the annular recess 20 is formed in the outboard rim 5 and the annular projection 25 is formed in the inboard rim 6, it should be of course appreciated that the annular recess 20 is formed in the inboard rim 6 and the annular projection 25 is formed in the outboard rim 5, conversely to the former.

In accordance with the present invention, as described in the foregoing, the joining surface 7 of the outboard rim 5 (inboard rim 6) is formed at its outer periphery with an annular recess 20 of L-shaped section, which is open in a radial direction and in a direction of the wheel axis. The annular recess 20 has a bottom surface 22 formed at its base portion with a peripheral groove 23 which receives therein an inner periphery of a seal ring 24. The joining surface 8 of the inboard rim 6 has at its outer peripheral portion an annular projection 25 of stepped-like section, which can be received into the annular recess 20 through the seal ring 24. In addition, the seal ring 24 is held in the direction of the wheel axis between the side 21 of the annular recess 20 and the side 28 of the inner annular projection 26 in the annular projection 25. The depth A of the annular recess 20 in the direction of the wheel axis is shorter than the sum of the diameter D in section of the ring 24 and the thickness B of the inner projection 26 in the direction of the wheel axis, that is, the relationship of $A < B + D$ is established. Accordingly, the seal ring 24 may be firmly pressed between the side 21 of the annular recess 20 and the side 28 of the inner annular projection 26 to provide a positive seal between the joining surfaces 7 and 8 of the outboard rim 5 and the inboard rim 6 thus preventing a leakage of pressure air within the tubeless tire T through the joining surfaces 7 and 8.

It is to be noted that in the prior art split rim arrangement, in which outboard and inboard rims are joined together and sealed in a radial direction, dimensions such as the outside diameter of a recessed portion of the inboard rim, the inside diameter of a stepped projection of the outboard rim and the clearance between the outside and inside diameters are all measured in the radial direction with reference to a common central axis of the annular-shaped inboard and outboard rims and as a result, precise machining and assembly of the two rims must be effected inefficiently with considerable skill and labor, giving rise to a difficult problem of accurately centering the rims in concentric relation with each other for most effective sealing.

In contrast, according to the present invention, it is possible to machine and assemble the inboard and outboard rims quite readily with high productivity because sealing surfaces formed in the respective rims are pressed against the seal ring in a direction of a wheel axis so that a certain amount of eccentricity in centering of the rims is allowed to attain the high sealing capacity without requiring such high tolerances as needed in the case of the prior art arrangement.

In addition, since the inside diameter $d_1$ of the outer annular projection 27 in the annular projection 25 is made greater than the outside diameter $d_2$ of the seal ring 24, there is no fear in connection of the outboard rim 5 with the inboard rim 6, that the outer annular projection 27 may engage the seal ring 24, thus preventing the seal ring 24 from damage and breakage.

Moreover, since the seal ring 24 can be fitted and retained in the peripheral groove 23 formed in the base of the bottom surface 22 of the annular recess 20 before assembly of the outboard rim 5 and the inboard rim 6, the seal ring 24 will not slip out irrespective of position where the outboard rim 5 (inboard rim 6) retaining the seal ring 24 is arranged when assembling the split rim R. This is so irrespective of application of slight vibration or shock thereto, and as a consequence, assembly may be accomplished in a simple manner and the seal ring 24 may be positively retained in position.

Many modifications and variations of the present invention are possible in light of the above teachings. It is, therefore, to be understood that within the scope of the appended claims, the invention may be practiced otherwise than as particularly described.

What is claimed is:

1. An apparatus for joining surfaces of a split rim in a wheel, said wheel comprising: a split rim having an outboard rim and an inboard rim having joining surfaces joined and integrally connected by connecting means, a tubeless tire mounted and held between rim flanges of said split rim, the device being constructed such that a joining surface of one of said respective rims is formed at its outer periphery with an annular recess 20 having an L-shaped section opening in a radial direction and in a direction of a wheel axis, said annular recess being provided with a bottom surface formed at its base portion with a peripheral groove receiving therein an inner periphery of a seal ring, the other rim having at its outer peripheral portion an annular projection of stepped-like section to be received into said annular recess through said seal ring, said annular projection being formed with an inner annular projection to bias the seal ring in a direction of a wheel axis and an outer annular projection to cover the radial outer periphery of the seal ring.

2. An apparatus as claimed in claim 1, wherein: the depth A of said annular recess in the direction of the wheel axis being shorter than the sum of the thickness B of the inner annular projection and the diameter D in section of the seal ring.

3. An apparatus as claimed in claim 1, wherein: the inside diameter $d_1$ of said outer annular projection being greater than the outside diameter $d_2$ of the seal ring.

* * * * *